Dec. 30, 1969 L. KATZ 3,487,328

METHOD OF AND APPARATUS FOR COOLING HEAT-RADIATING ARTICLES AND THE LIKE

Filed July 21, 1967

INVENTOR
LEONHARD KATZ

BY Rines and Rines

ATTORNEYS

United States Patent Office 3,487,328
Patented Dec. 30, 1969

3,487,328

METHOD OF AND APPARATUS FOR COOLING HEAT-RADIATING ARTICLES AND THE LIKE

Leonhard Katz, Woburn, Mass., assignor to Astro Dynamics, Inc., Burlington, Mass., a corporation of Massachusetts Filed July 21, 1967, Ser. No. 655,111
Int. Cl. H01s 3/04
U.S. Cl. 331—94.5 4 Claims

ABSTRACT OF THE DISCLOSURE

Circulatory gases, such as nitrogen, if pressurized to values at which the pressure versus viscosity, specific heat and thermal conductivity characteristic curves remain substantially constant, have been found to effect efficient cooling of heat-radiating articles disposed in heat-transfer relationship with such circulating gas.

The present invention relates to methods of and apparatus for cooling heat-radiating articles and the like.

For centuries, coolant fluids have been circulated past articles-to-be-cooled in order to carry off heat emanating from said articles. Such systems have been limited in their efficacy, however, by the heat-transfer coefficient and other characteristics of the coolant, the quantity and rate of flow or circulation of the coolant and, from the practical point of view, the amount of energy or horsepower (later referred to as HP) required to circulate the coolant. In accordance with the present invention, however, it has, in summary, been discovered that certain gases, if pressurized within certain absolute pressure limits, and then circulated in heat-transfer relationship with heat-radiating articles, can provide remarkably more effective cooling per unit of horsepower than heretofore-known coolants, and with other advantageous results, also.

An object of the invention, accordingly, is to provide a new and improved method of and apparatus for cooling heat-radiating articles and the like, and of broad general applicability.

A further object is to provide such a novel apparatus that is particularly suited to the cooling of concentrated heat sources including electrical components and the like.

Other and further objects will be explained hereinafter and are more fully delineated in the appended claims.

Figure 1:
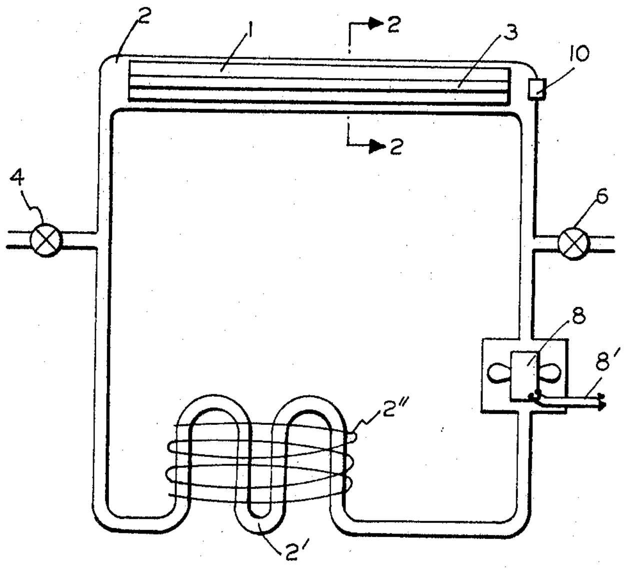
Figure 2:
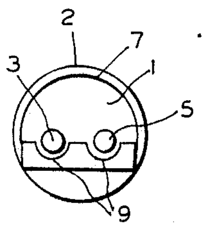
Figure 3:
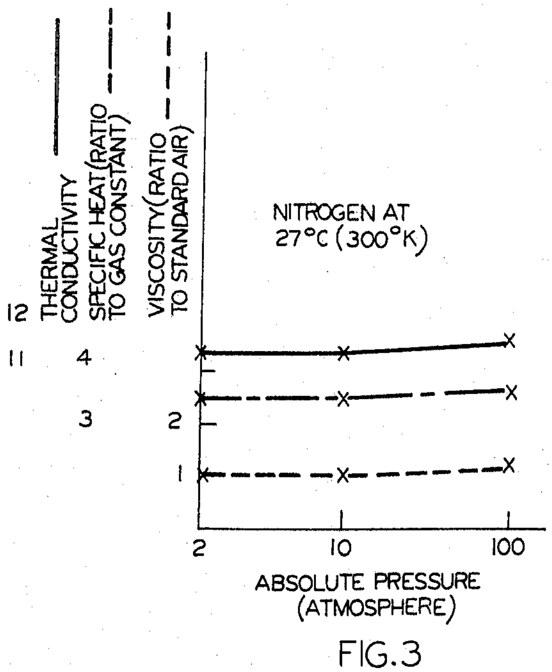
Figure 4:
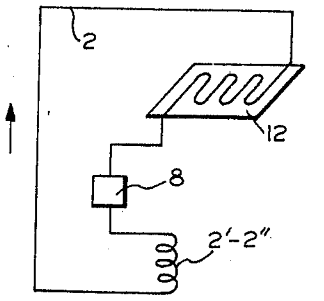

The invention will now be described with reference to the accompanying drawings, FIG. 1 of which is a schematic flow diagram of a preferred apparatus showing the application of the invention to the illustrative problem of cooling a laser cavity or the like;

FIG. 2 is a cross-section, upon a somewhat enlarged scale, taken along the line 2—2 of FIG. 1, looking in the direction of the arrows;

FIG. 3 is a graph illustrating preferred operating ranges of pressurized gas, pressure being plotted along the abscissa in atmospheres, and each of the viscosity $\mu$ (with respect to that of standard air, i.e. $\mu/\mu_{air}$), the specific heat $C_p$ (with respect to the absolute gas constant), and the thermal conductivity K (in units of B.t.u./hr. ft.$^2$ ° F./ft.), being plotted along the ordinate; and FIG. 4 is a schematic chart of the application of the invention to a cooling plate or the like.

In the cooling of concentrated heat sources, such as electronic components, lasers, flash tubes, etc., and in the cooling of distributed heat sources which are cooled by means of forced convection, whether direct or through heat exchangers, cold plates, etc., it has been customary, for example, to circulate air over the components to be cooled. In such cooling, there are three equations which govern the amount of cooling that can be obtained; namely, $$Q=WC_p\Delta t_{air} \quad (1)$$

$$Q=hA\Delta t_m \quad (2)$$

and $$\frac{hD}{K}=C(Re)^m(Pr)^n \quad (3)$$

where:

$Q$=Heat transferred in B.t.u./hr.,
$C_p$=Specific heat in B.t.u./lb. ° F.,
$\Delta t_{air}$=Temperature rise of air, ° F.,
$\Delta t_m$=Log mean temperature difference, ° F.,
W=Mass flow of air, lbs./hr.,
$h$=Heat transfer coefficient, B.t.u./hr. ft.$^2$ ° F.,
A=Surface area of component, sq. ft.,
D=Diameter of component or duct, ft.,
$m$=Exponent, .8 for turbulent flow,
$n$=Exponent, .4 for turbulent flow,
K=Thermal conductivity air, B.t.u./hr. ft.$^2$ ° F./ft.,
$Re$=Reynolds number, and
$Pr$=Prandtl number.

From Equation 1, it may be seen that the temperature rise of the air is determined by its specific heat, the mass flow of air and the total heat input into the air. The temperature of the component, however, is also determined by the degree of coupling that exists between the air stream and the component. This is expressed by the heat transfer coefficient $h$; and, from Equation 2, it may be observed that the temperature difference which will exist between the air stream and the component (the log mean temperature difference $\Delta t_m$) will be affected by the temperature rise, $\Delta t_{air}$, of Equation 1. The heat transfer coefficient $h$ is determined by Equation 3 which correlates the heat transfer coefficient with various dimensionless parameters which contain the velocity, density, viscosity, and thermal conductivity of the fluid. It is advantageous, therefore, if optimum cooling is to be obtained, to increase the heat transfer coefficient to its maximum value by obtaining the maximum Reynolds number possible. Since the Reynolds number is directly proportional to the velocity of the flow, this usually involves selecting the largest possible velocity of the air over the components. There is, however, a limitation to the velocity of air which can be obtained economically, since air velocity must be paid for in the form of pressure drop which ultimately results in the expenditure of horsepower. The pressure drop equation is as follows:

$$\frac{\Delta p}{L}=\frac{2fG^2}{144g\rho D} \quad (4)$$

where:

$f=16/Re$ for laminar flow,
$f=.046/(Re)^{0.2}$ for turbulent flow,
G=Mass velocity of air, lbs./hr., sq. ft. of cross section,
$g$=Acceleration of gravity, $4.17\times10^8$ ft./hr.$^2$, and
$\rho$=Density, lbs./cu. ft.

The horsepower equation is $$HP=\frac{Wa\times\Delta p\times144}{\rho_a\times\eta_c\times550\times3600} \quad (5)$$

where:

$W_a$=Mass flow of air lbs./hr.,
$\Delta p$=Pressure drop in p.s.i.,
$\rho_a$=Density of air in lbs./cu. ft., and
$\eta_c$=Efficiency of compressor, blower or fan.

Underlying the present invention is the utilization of certain critically pressurized or compressed gases circulated in the cooling system. In the use of compressed gases, several remarkable advantages have been attained. First, for the same horsepower expended, it is possible to obtain a very much smaller $\Delta t_{air}$ (See Equation 1). Secondly, for the same horsepower expended, it is possible to obtain a very much larger value of $h$, thereby maintaining the temperature of the components at a much lower value. This compressed gas cooling system can therefore be used either for cooling specific components, such as the before-mentioned lasers, flash tubes, etc., as in the system of FIG. 1, or it can be used in heat exchangers, such as cold plates or tube and fin-type heat exchangers to efficiently transfer heat to secondary coolant systems, as later described in connection with the embodiment of FIG. 4.

Further underlying the invention is the realization and utilization of the fact that, for a number of gases, such as nitrogen, for instance, there are regions over which the viscosity does not change significantly as the density is increased. Since the Reynolds number $Re$ can be written as $$Re=\frac{DV\rho}{\mu}=\frac{4W}{\mu p}$$

V=Velocity in ft./hr.,
$\mu$=Viscosity in lbs./hr. ft.,
$p$=Wetted perimeter of heat exchanger in feet,
W=Mass flow of air, lbs./hr., it can immediately be seen that if the viscosity does not change, the Reynolds number is directly proportional to W. Referring back to Equation 4, it will be evident that if the mass flow of gas in a system is maintained constant while the density is increased, the pressure drop will be inversely proportional to the density. Consequently, if a system is compressed to 10 atmospheres of pressure so that the density increases by a factor of 10, the same mass flow can be obtained for $1/10$ the pressure drop through the system. Again, if the mass flow is maintained the same, it may be observed from Equation 5 that the horsepower required to pump the same mass flow at ten times the density is now $1/100$ of the horsepower required at atmospheric pressure.

If, moreover, instead of maintaining the mass flow the same, the horsepower required for pumping is kept the same, it now follows that the product $Wa\Delta p/\rho_a$ will remain constant. This can be done by keeping $\Delta p$ constant in the system. For constant horsepower, however, it turns out that $W\sim\rho^{0.71}$ and $h\sim W^{0.8}\sim\rho^{0.57}$.

In accordance with the invention, accordingly, as above mathematically demonstrated, a ten-fold increase in density at the same horsepower will thus result in a 3.7-fold increase in heat transfer coefficient. In addition, the temperature rise of the air (Equation 1), will be reduced by a factor of ten, so as to reduce not only $\Delta t_{air}$ in Equation 1, but $\Delta t_m$ in Equation 2.

An apparatus employing the above concepts is shown in FIG. 1, illustratively applied to the problem of cooling a laser cavity 1 containing a laser rod or other source 3 that is energized by the radiation from an adjacent flash lamp 5 mounted between upper and lower reflectors 7 and 9, FIG. 12, all as is well-known. The concentrated heat source represented by the laser cavity 1 is disposed within or as part of a confined space or conduit 2 having a pressurized gas inlet 4 and outlet 6 which are operated to provide a closed system in which the gas flows through the conduit 2 (and the laser cavity 1 disposed therein) under the circulating action of a blower 8, externally electrically energized at 8'. The radiation from the laser 3 is transmitted through the flowing gas and an appropriate window 10 in the conduit 2. Heat-exchange external to the conduit 2 is shown effected by a heat-exchanger portion 2' thereof that may be provided with external coils 2'', as is also well known.

In the case of pressurized nitrogen introduced at inlet 4, for example, at 27° C. (300° K.), it has been determined that in the region from about two atmospheres to about ten atmospheres, each of the pressure-viscosity (dash-line curve), pressure-specific heat (dash-dot-line curve) and pressure-thermal conductivity (solid-line curve) characteristics remains substantially constant within respective ranges of substantially 1.074–1.093 (viscosity ratio with respect to that of standard air), 3.51–3.55 (specific heat ratio with respect to the absolute gas constant), and 11.35–11.37 B.t.u./hr. ft.$^2$ °F./ft. This substantial constancy, indeed, extends at least to 100 atmospheres (and above) where the respective viscosity ratio, specific heat ratio and thermal conductivity have values of substantially 1.187, 3.66 and 11.63.

One of the further advantages in the use of pressurized nitrogen in the system of FIG. 1 resides in the fortuitous feature (as compared with present-day fluorocarbon coolants) that ultraviolet radiation of flash tubes and the like does not effect any decomposition or degradation in visible radiation transmission over the regions in question, the gas remaining transparent over wide wavelength bands outside the absorption wavelengths thereof.

In tests with nitrogen pressurized at about 20 atmospheres (300 pounds per square inch) with a heat-radiating article within the conduit 2 and a blower 8 circulating the gas at about 50 cubic feet per minute (c.p.m.), producing a substantially constant pressure drop, a significantly smaller temperature difference was obtained between the article and the heat-exchanger cooler 2'' than with unpressurized nitrogen.

Other gases having certain of these advantageous features of nitrogen for the purposes of the invention are also usable. Compressed air, which, of course, contains nitrogen, behaves much like nitrogen. Oxygen has substantially the same thermal conductivity as nitrogen, about 12½% less specific heat and about 12½% greater viscosity. The viscosity of helium is about the same as oxygen, while helium's specific heat is about five times that of nitrogen and its thermal conductivity about six times that of nitrogen and oxygen. Hydrogen has about fifteen times the specific heat of nitrogen, about half the viscosity of nitrogen and about seven times the thermal conductivity of oxygen and nitrogen. Hydrogen and oxygen, however, are more dangerous because of their explosive character under pressure.

More specifically, consider the case of a conduit 2 of ½'' diameter, 12'' length and internal surface area of 18 in.$^2$, and external heating at a rate of 100 watts, with atmospheric air circulated through the conduit by the blower 8 at a rate of 10 c.f.m., resulting in a pressure drop of 6.4'' water or 0.23 p.s.i. The power expended may be calculated from Equation 5 as follows:

$$HP=\frac{10\times 60\times .23\times 144}{\eta\times 550\times 3600}$$

If the efficiency of the blower 8 is assumed to be 100%, a value of 0.00285 (HP) or 2.6 watts is attained. The temperature rise, $\Delta t_{air}$ Equation 1 is now found to be $\Delta t_{air}=34°$ F.; and the heat transfer coefficient $h$ is found to be ($Re$=28,000) $h$=28. Substituting in Equation 3, $\Delta t_m=97°$ F. Since $\Delta t_{air}=34°$ F., the average tube temperature is therefore about 97°+17° or 114° F. above inlet air temperature.

In accordance with the invention, on the other hand, consider the air as pressurized at an absolute pressure of 300 p.s.i. (20 atmospheres); i.e., $$\frac{\rho_2}{\rho_1}=20$$

It follows that $$\left(\frac{\rho_2}{\rho_1}\right)^{.57}=5.5$$

from which $h=5.5\times 28$ or 154, producing $\Delta t_m$ of 17.6° F. Similarly the $\Delta t_{air}$ has now been reduced to $\Delta t_a=1.7°$ F. This then results in a component temperature of about 18° F., which represents a tremendous improvement over the previous value of 114° F., demonstrating further the efficacy of the invention.

While the invention has been described in connection with the article-to-be-cooled disposed within and in contact with the flowing pressurized gas, the cooling can be effected by a cold plate 12, FIG. 4, along which, for example, a zigzag portion of the conduit extends and which is placed in heat-transfer contact with an external article-to-be cooled. Similarly convection-effected flow may be used in some systems in place of or in supplement to the blower 8.

Further modifications will also occur to those skilled in the art, all such being considered to fall within the spirit and scope of the invention as defined in the appended claims.

What is claimed is:

1. Apparatus comprising, in combination, conduit means having a laser disposed in a predetermined portion thereof, means for introducing nitrogen into the conduit means under absolute pressure greater that that external to the conduit means and at least substantially two atmospheres, said pressure lying within a region over which each of the pressure-viscosity, pressure-specific heat and pressure-thermal conductivity characteristic curves of said nitrogen remain substantially constant, blower means disposed within the conduit means for circulating the nitrogen therethrough, and heat-exchanger means disposed at another predetermined portion of the conduit means through which the nitrogen is circulated, said laser having lasing means substantially surrounded by said nitrogen and disposed to emit a beam of laser light which passes through the circulating nitrogen.

2. Apparatus as claimed in claim 1 and in which said nitrogen introducing means comprises means for supplying nitrogen at an absolute pressure of at least ten atmospheres.

3. Apparatus as claimed in claim 1 and in which said nitrogen introducing means comprises means for supplying nitrogen at an absolute pressure of at least twenty atmospheres.

4. Apparatus as claimed in claim 1, and in which said laser comprises a flash-lamp means disposed within the circulating nitrogen.

References Cited

UNITED STATES PATENTS

| | | | |
|---|---|---|---|
| 1,905,811 | 4/1933 | Culver | 165—107 X |
| 3,195,620 | 7/1965 | Steinhardt | 62—514 X |
| 3,293,564 | 12/1966 | Fann | 331—94.5 |
| 3,319,183 | 5/1967 | Lempicki et al. | 331—94.5 |
| 3,375,675 | 4/1968 | Trepp et al. | 62—514 X |

WILLIAM E. WAYNER, Primary Examiner

U.S. Cl. X.R.

165—1, 107; 174—16